United States Patent [19]

Artzer

[11] 4,226,067
[45] Oct. 7, 1980

[54] STRUCTURAL PANEL

[75] Inventor: Richard F. Artzer, Riverside, Calif.

[73] Assignee: Covington Brothers Building Systems, Inc., Riverside, Calif.

[21] Appl. No.: 857,235

[22] Filed: Dec. 5, 1977

[51] Int. Cl.² .............................................. E04C 2/26
[52] U.S. Cl. .................................. 52/309.12; 52/410; 29/446
[58] Field of Search ................... 52/404, 309.4, 309.7, 52/727, 730, 650, 648, 223 R, 227, 309.11, 144, 145, 405, 407, 406, 495, 228, 224, 225, 577, 576, 396; 428/101, 256, 223; 29/446; 404/64, 66, 68, 69

[56] References Cited

U.S. PATENT DOCUMENTS

| | | |
|---|---|---|
| 427,914 | 5/1890 | Schillinger . |
| 978,002 | 12/1910 | Bruchartz . |
| 1,042,808 | 10/1912 | Macmanus ............................ 52/727 |
| 1,042,885 | 10/1912 | Budd et al. . |
| 1,234,244 | 7/1917 | Willsie . |
| 1,555,914 | 10/1925 | Denning . |
| 1,795,716 | 3/1931 | Eckland ................................ 52/727 |
| 1,809,504 | 6/1931 | Carvel . |
| 1,831,897 | 11/1931 | Wagner . |
| 1,945,933 | 2/1934 | Chilowsky et al. . |
| 2,061,633 | 11/1936 | Muller . |
| 2,063,309 | 12/1936 | Graef . |
| 2,140,283 | 12/1938 | Faber . |
| 2,192,183 | 3/1940 | Deutsch . |
| 2,262,899 | 11/1941 | Mechlin . |
| 2,268,251 | 12/1941 | Haux . |
| 2,291,116 | 7/1942 | Streater . |
| 2,324,435 | 7/1943 | Smith . |
| 2,368,047 | 1/1945 | Southwick . |
| 2,522,116 | 9/1950 | Hayes . |
| 2,540,349 | 2/1951 | Reed . |
| 2,618,960 | 11/1952 | Orzel . |
| 2,718,138 | 9/1955 | Jones . |
| 2,744,042 | 5/1956 | Pace . |
| 2,831,232 | 4/1958 | Lawson . |
| 2,939,206 | 6/1960 | Keller . |
| 2,975,488 | 3/1961 | Brauner . |
| 3,000,144 | 9/1961 | Kitson . |
| 3,003,199 | 10/1961 | Talmey . |
| 3,010,493 | 11/1961 | Fingerut . |
| 3,082,486 | 3/1963 | Khawan et al. . |
| 3,091,998 | 6/1963 | Wehr et al. . |
| 3,093,935 | 6/1963 | Dunn . |
| 3,150,032 | 9/1964 | Rubenstein . |
| 3,157,144 | 11/1964 | De Jarnett . |
| 3,158,925 | 12/1964 | Edge . |
| 3,232,017 | 2/1966 | Prusinski . |
| 3,239,982 | 3/1966 | Nicosia . |
| 3,249,659 | 5/1966 | Voelker . |
| 3,270,103 | 8/1966 | Kurtz . |
| 3,295,278 | 1/1967 | Muhm . |
| 3,305,991 | 2/1967 | Weismann . |
| 3,388,509 | 6/1968 | Mora . |
| 3,407,560 | 10/1968 | Baumann . |
| 3,435,567 | 4/1969 | Tyson . |
| 3,484,331 | 12/1969 | Betz . |
| 3,488,909 | 1/1970 | Bahr . |
| 3,494,088 | 2/1970 | Korner . |
| 3,522,685 | 8/1970 | Oroschakoff . |
| 3,555,131 | 1/1971 | Weismann . |
| 3,832,815 | 9/1974 | Balaz et al. . |
| 3,838,241 | 9/1974 | Weismann . |
| 3,879,908 | 4/1975 | Weismann ........................ 52/309.11 |
| 3,990,203 | 11/1976 | Greaves . |
| 4,079,560 | 3/1978 | Weismann . |
| 4,104,842 | 8/1978 | Rockstead . |
| 4,120,330 | 10/1978 | Weismann . |

FOREIGN PATENT DOCUMENTS 866388 4/1961 United Kingdom .

Primary Examiner—John E. Murtagh
Attorney, Agent, or Firm—Gausewitz, Carr, Rothenberg & Edwards

[57] ABSTRACT

A modular lightweight structural panel is made of a lightweight expanded plastic filler reinforced by wire lattice structures. A number of long, narrow filler elements are interleaved with a number of substantially flat lattice structures to form a laminated panel subassembly with corresponding surfaces of the filler elements collectively forming substantially planar surfaces of the panel core. The subassembly is laterally compressed, in a direction perpendicular to the planes of laminations, to thereby force each of the lattice structures to be pressed into and partially embedded in mutually contiguous surfaces of adjacent ones of the filler elements.

While in such compressed condition, a number of cross-members are fixed to side portions of the several lattice structures that protrude beyond the panel surfaces to thereby hold the assembly in its pressed condition with the lattice structures embedded in the filler elements and the surfaces of adjacent filler elements in close physical contact with one another. The completed panel assembly is thereafter coated with a suitable mixture of concrete, plaster, or the like.

21 Claims, 12 Drawing Figures

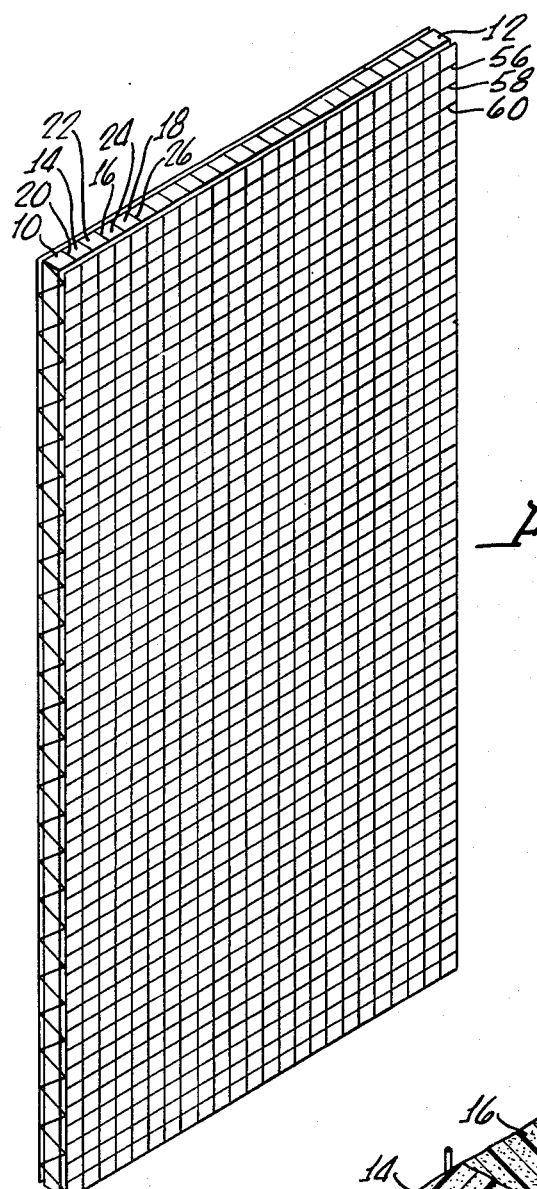
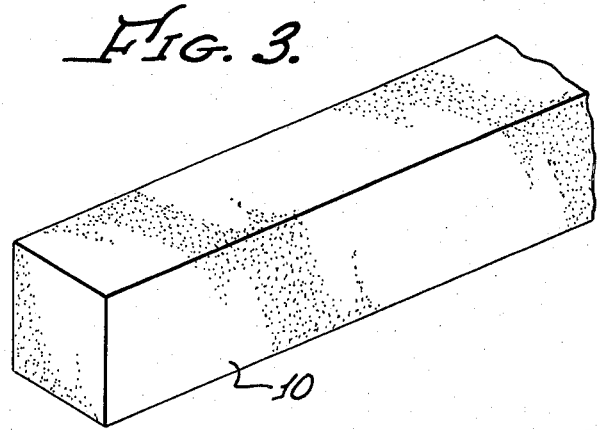
Fig. 3.
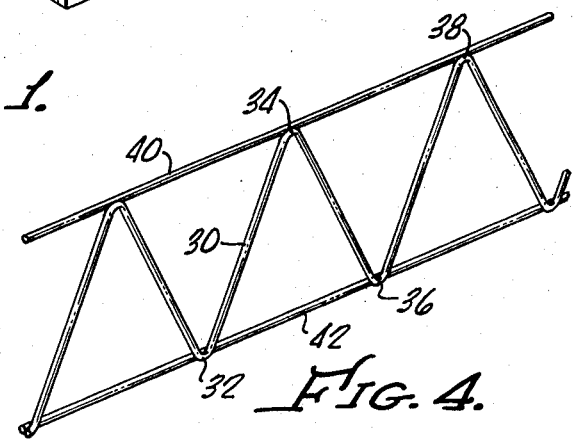
Fig. 1.
Fig. 4.
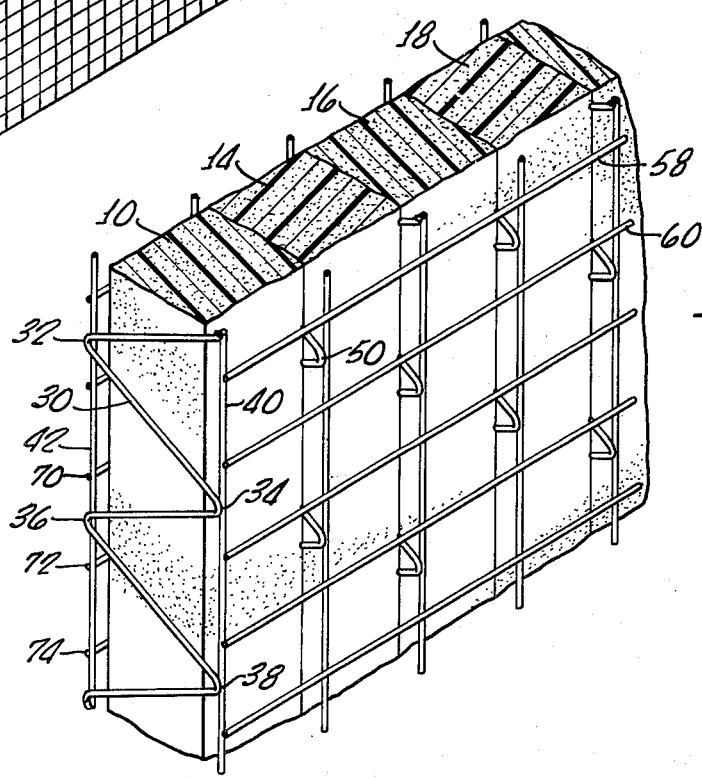
Fig. 2.

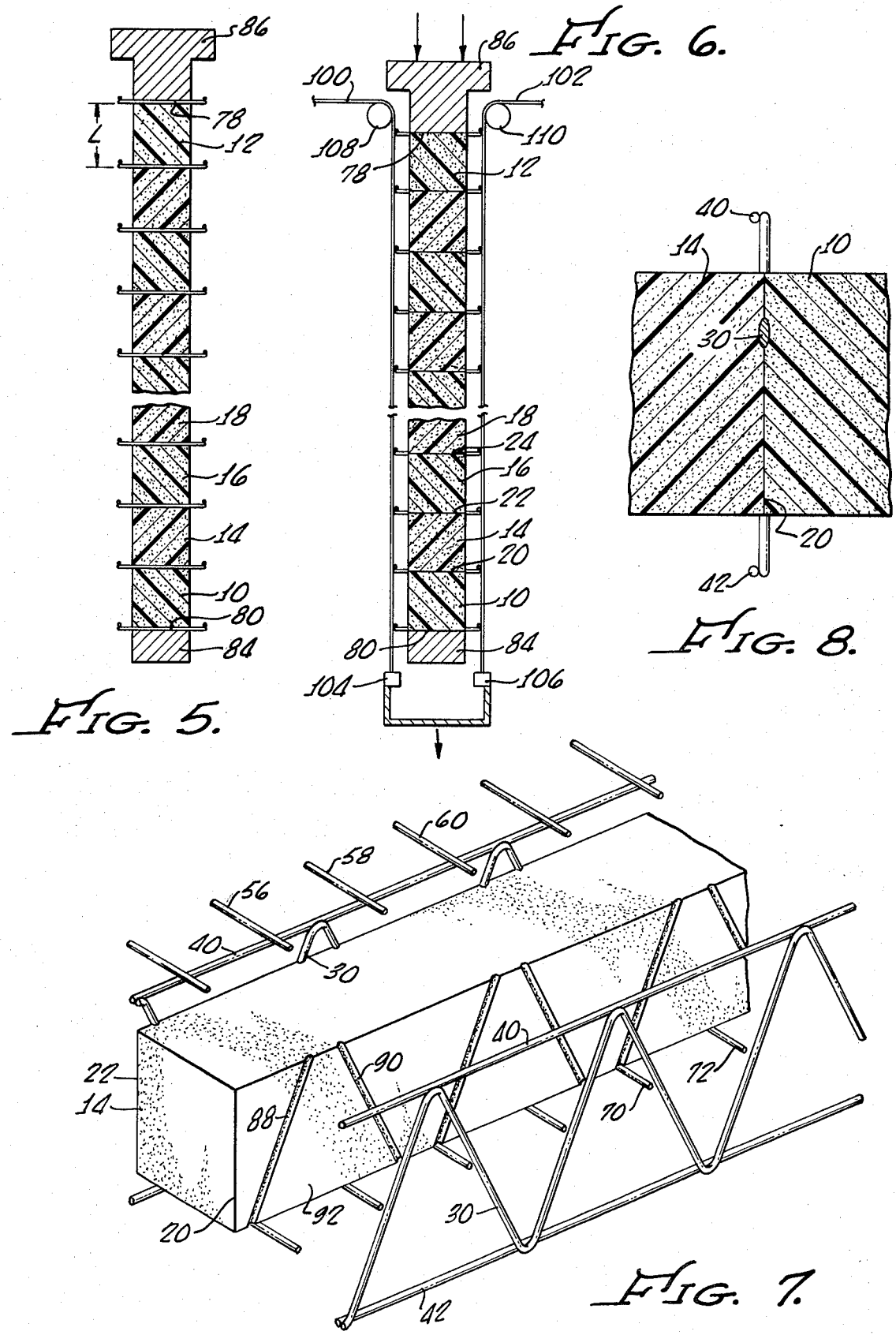

STRUCTURAL PANEL

BACKGROUND OF THE INVENTION

The present invention relates to structural panels and more particularly concerns such panels and methods for their manufacture that employ filler materials, having certain desirable properties, together with reinforcing structures to provide a unitary panel structure.

Lightweight plastic materials, including the many different types of foamed synthetic resins and expanded plastic foams, such as urethanes, polystyrenes, and the like, have a number of properties that are highly desired in building materials for various types of structures such as walls, roofs and the like. These properties include light weight, exceedingly low thermal conductivity, resistance to abrasion, impermeability to moisture, and acoustic insulation. However, such materials generally are deficient in structural strength and therefore must be combined in some manner with other materials having satisfactory structural properties.

Various configurations employing combinations of lightweight cellular plastic foams or expanded plastic bodies and rigid load-bearing structural elements have been suggested in the past for providing structural building panels that can effectively utilize the desirable properties of the cellular materials. Typical of such prior art arrangements, are the U.S. Pat. Nos. to Weisman 3,305,991, 3,555,131 and 3,879,908. In U.S. Pat. Nos. 3,305,991 and 3,555,131, there is described a structural panel and a technique for manufacture thereof in which a three-dimensional reinforcing framework is first built up and then a lightweight plastic core is formed in situ within the framework, and positioned so that the outer surfaces of the resulting foamed in place core are hopefully located inwardly of the outer boundaries of the three-dimensional framework. It is desired to have the framework extend outwardly of the core so that the hybrid panel, the combination of cellular material and rigid framework, may be coated with plaster, gunnite, stucco or the like, in which the projecting portions of the structural framework may be embedded. However, because the cellular material is foamed in place, a form must be provided to define the bottom surface of the foam core. Since this form must be positioned above one outer side of the prefabricated structural framework, difficulties are encountered in maintaining the form in a planar configuration and in positioning the form at a precise distance from the outer surface of the framework.

Further, since no form is generally employed to define the upper surface of the foamed in place core (the panel core is foamed in place within the structural framework, with the panel in a horizontal position according to the teaching of the patents), the foam core will exhibit an outer surface that is far from the desired planar condition. It will exhibit a surface of such irregularity and imprecise location that the foam core may actually contact the outer elements of the structural framework in many places, thereby preventing a subsequent coating from completely encompassing such outer portions of the framework.

The later U.S. patent to Weisman No. 3,879,908 avoids some problems of the use of foamed in place material and instead, after building a completed three-dimensional structural framework that covers the entire panel on all six sides thereof, inserts a plurality of insulative elements through passages that are disposed wholly within the structural framework. These insulative elements must be dimensioned so as to freely and easily pass between adjacent elements of the structural framework and, when positioned, will not have adjacent surfaces in contact with one another. Impermeability to moisture is thereby greatly degraded. Thereafter a bonding agent is employed in the arrangement of the Weisman U.S. Pat. No. 3,879,908 to secure the insulative elements in position within the lattice. This bonding agent is a layer of material that is foamed in place; but in a somewhat thinner layer than the remainder of the core, and is employed to bond the insulative elements to the metal elements of the structural framework. This is a time-consuming and expensive procedure, and still provides a panel surface formed by a foamed in place bonding agent. Such surface may be irregular and improperly positioned with respect to the outer surface of the structural framework. Further, since the insulative elements must be inherently spaced from one another in order to allow them to be inserted into the passages in the structural framework, they can form no vapor or moisture barrier. Their heat and sound insulating properties also are significantly degraded by virtue of the space between adjacent insulating elements, even though the ends of such spaces are covered by the foamed in place bonding agent.

Accordingly, it is an object of the present invention to provide a composite structural panel that avoids or minimizes above-mentioned problems.

SUMMARY OF THE INVENTION

In carrying out principles of the present invention in accordance with a preferred embodiment thereof, a plurality of elongated filler elements and a plurality of substantially flat lattice structures are interdigitated, in consecutive alternation, and then laterally pressed against one another to forceably embed the lattice structures in the filler elements. While holding such interdigitated structures and elements in laterally pressed condition, the lattice structures are fixedly secured to one another. A reinforced panel embodying principles of the present invention comprises a plurality of laterally contiguous elongated filler elements, each having a surface lying in a common plane, and a plurality of lattice structures respectively interposed between members of respective adjacent pairs of said filler elements, the lattice structures being pressed at least partly into laterally contiguous surfaces of the adjacent filler elements. A plurality of cross-members are fixed to at least some of the lattice structures to hold the lattice structures and filler elements in a configuration defining a laterally laminated panel.

BRIEF DESCRIPTION OF THE DRAWINGS

FIG. 1 is a perspective view of a structural panel embodying principles of the present invention;

FIG. 2 is a fragmentary pictorial view, to a larger scale, of a portion of the panel of FIG. 1;

FIG. 3 is a perspective view of a part of a single filler element of the panel of FIG. 1;

FIG. 4 is a pictorial view of a portion of a single lattice structure;

FIG. 5 illustrates a subassembly of the panel of FIG. 1, in partly assembled condition, prior to lateral compression;

FIG. 6 illustrates positioning of the cross wires adjacent opposite sides of the compressed subassembly of filler elements and interposed lattice structures;

FIG. 7 is an exploded perspective view illustrating the relation of lattice structures and filler elements of the finished panel;

FIG. 8 is a fragmentary sectional view illustrating the face-to-face contact of adjacent filler elements and an interposed portion of a lattice structure;

DETAILED DESCRIPTION OF THE INVENTION

As shown in FIG. 1, a combined foam and wire reinforced structural panel embodying principles of the present invention includes a plurality of elongated filler elements, including end elements 10 and 12 and a plurality of intermediate elements, including elements 14, 16, 18, etc., interposed between the end elements and all having their adjacent surfaces in substantially complete face-to-face contact except for certain points to be described hereinafter.

In a presently preferred form, each filler element (FIG. 3) has a length equal to the length of the panel which, for a common panel size, is eight feet, and has a thickness, as measured in the direction of the panel thickness, of two inches, and a width, as measured in the direction of the width of the panel, of two inches. The cross-section of each filler element of a preferred embodiment is substantially square and each face of the filler element is planar and at right angles to a pair of adjacent faces. Thus in assembled condition, with the filler elements aligned with one another as illustrated in FIG. 1, corresponding faces, such as upper faces of the elements when viewed in FIG. 1, lie on a common surface which is illustrated as being planar, although other than planar surface configurations may be employed. It is presently preferred to employ twenty-four two-inch filler elements for a panel, thereby to provide a panel about four feet wide.

Figure 9:
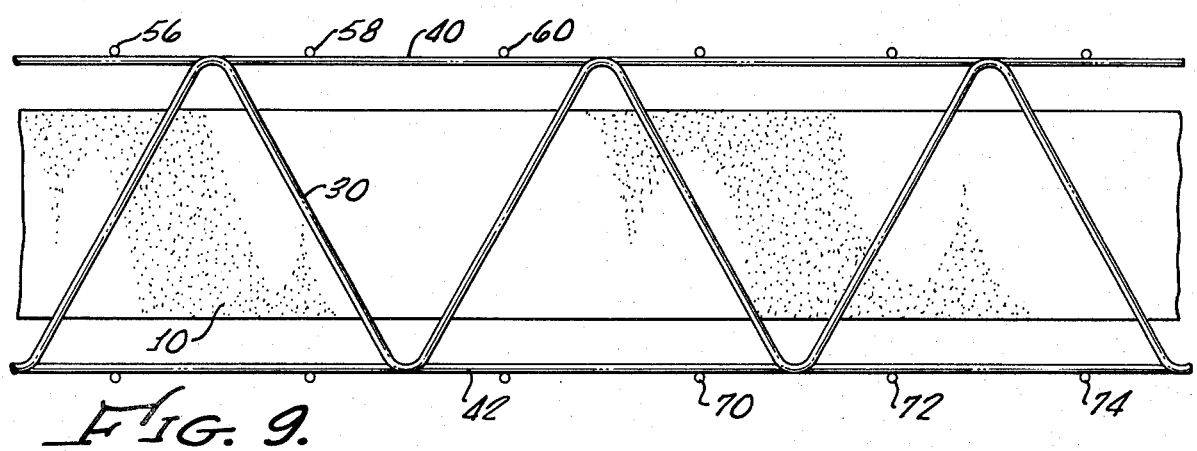
FIG. 9 is a side view of a portion of the completed panel.

Interposed between filler elements of each adjacent pair of filler elements are rigid lattice structures, typical ones of which are designated at 20, 22, 24 and 26. The lattice structures are substantially planar or, in effect, two-dimensional, and have a depth greater than the thickness of any one of the filler elements so that outer side portions of each of the elongated lattice structures project beyond the common panel surface defined collectively by the adjacent filler elements, as best seen in FIGS. 2 and 9.

Each lattice structure is identical to each other lattice structure and, as illustrated in FIGS. 2 and 4, each is formed of a relatively rigid sinuously bent wire 30 having a zig-zag configuration that defines alternate apices such as those indicated at 32, 34, 36, 38. Fixed to the sinuous rod 30, as by welding for example, is a pair of mutually spaced parallel side rods or wires 40, 42 that are spot welded to the sinuous rod 30 at the apices on respectively opposite sides thereof, at apices 34, 38, etc. for rod 40 and at apices 32, 36 for rod 42. Thus a rigid planar or substantially two-dimensioned lattice structure is provided. The depth of the lattice structure, that is, the shortest distance between side rods 40 and 42, is not less than and preferably greater than the thickness of the filler elements 10-18, etc. For example, where the filler elements have a thickness of two inches, a preferable depth of the lattice is three inches and each side bar of a lattice is positioned above the common surface collectively defined by the several filler elements at a distance of approximately ½ inch.

Although the several lattice structures may be positioned relative to one another along the eight foot length of the four foot by eight foot panel in any number of different positions, the corresponding apices of adjacent lattice structures, such as apex 34 and the corresponding apex 50 of the adjacent lattice structure (FIG. 2), may be staggered longitudinally of the panel relative to one another or they may be aligned if necessary or desirable. The alternate or staggered configuration, shown in FIG. 2, is presently preferred since this arrangement will provide greater reinforcement for edges of a portion of the panel that has been severed. Thus, when it is desired or necessary to cut a portion of the completed four foot by eight foot panel, different ones of the lattice structures will have their severed portions at different distances from the outer panel surfaces, if the lattice structures are staggered so that the corresponding apices are not aligned across the width of the panel.

It is important to note that the panel components are held together by the connection of the several lattice structures to one another. This is achieved by a plurality of longitudinally spaced cross rods, such as rods 56, 58, 60 and corresponding rods similarly spaced and positioned along the length of the panel. Each rod is fixed as by spot welding, for example, to a side rod such as side rod 40, of each of the lattice structures. A plurality of longitudinally spaced cross rods, substantially identical to the rods 58, 60, etc. on one side of the panel, is provided on the other side of the panel, all of such additional plurality of cross rods being fixed as by spot welding for example to the second side rods 42 at the other side of each of the lattice structures. Thus a rigid unitary three dimensional skeletal framework is provided by means of the relatively rigid truss-like lattice structures 20, 22, 24, 26, etc. which are rigidly interconnected to each other in laterally spaced relation by means of the cross rods 58, 60, etc. on one side of the array of lattice structures and by similar cross rods such as 70, 72, 74 (FIG. 9) on the other side of the lattice structures, on the other side of the panel.

The filler elements have contiguous surfaces, adjacent faces being in direct planar physical contact with each other, thereby to provide a continuity of heat and sound barriers and insulation afforded by the filler material itself. No bonding agent is needed to secure the components to one another and, although a bonding agent may be employed if deemed necessary or desirable, the components are suitably held together by virtue of the assembly techniques that now will be described.

In manufacture of the described panel, the filler elements 10 through 18, etc. are first formed, each being identical to each other in a preferred embodiment, although they may be made of various widths if deemed necessary or desirable. Conveniently, the eight foot by two inch by two inch filler elements are cut from a single sheet of eight foot by two foot by two inch foam, although the strips may be cut from other sizes of sheets or formed other than by cutting, as by directly molding the strips, for example.

Each of the substantially two-dimensional lattice structures is made, each comprising a sinuous rod 30 and a pair of side rods 40 and 42 fixed thereto. All the lattice structures and filler elements are made or cut to the same length, which is eight feet for the illustrated two foot by eight foot panel, and then a number of filler elements and lattice structures are interdigitated with one another and stacked vertically (with stack resting on a side edge of the panel subassembly) in a panel subassembly substantially as shown in FIG. 5. The subassembly of FIG. 5 includes a pair of top and bottom or outer lattice structures 78, 80, the previously described outermost filler elements 10 and 12, and additional filler elements and lattice structures positioned in consecutive alternation. Where a panel of four feet in width is to be made, using filler elements of two inches in width and lattice structures of a thickness of approximately 0.08 inches, the pre-assembly stack, as illustrated in FIG. 5, will include 24 filler elements providing a total of 48 inches of filler elements and 25 lattice structures since there is one lattice structure for each filler element and one additional lattice structure on the end of the stack. Since 25 lattice structures have a collective thickness of two inches, the total height of the pre-assembly vertical stack, as illustrated in FIG. 5, is 48 inches plus 2 inches, or 50 inches.

In the pre-assembly condition of FIG. 5, before vertical compressive force is applied, mutually facing sides of adjacent lattice structures are spaced apart by a distance L that is not less than (actually equal to) the lateral dimension between opposite (top and bottom, as viewed in FIG. 5) surfaces of the interposed filler elements, such dimension being two inches in the exemplary embodiment described herein. In other words, the lattice structures merely touch but do not penetrate the contiguous surfaces of adjacent filler elements, and such surfaces are mutually spaced at this time, by the thickness of the interposed lattice structure.

The stack is now vertically compressed between a fixed lower support 84 and a movable upper pressure arm 86. The compression drives the relatively slender narrow rods or wires of the lattice structures into the adjacent surfaces of the filler elements whereby the latter are deformed along the lines of contact with the lattice structures to provide pressed grooves, such as grooves 88 and 90 (FIG. 7) in the lateral surface 92 of the filler elements. The pressure is not great enough to significantly change the dimension of any of the filler elements. As a corollary to the forming of the pressure grooves 88, 90, and the like in the filler elements, the lattice structures are pressed into the lateral surfaces such as surface 92 of the filler elements and partly embedded therein, as best shown in the detailed illustration of FIG. 8. It is only the sinuous rod 30 of the lattice structures and not the side rods 40 and 42 that are pressed into the filler elements since the side rods 40 and 42 are fixed to the sinuous rod apices and these apices, together with the side rods, are positioned outwardly of the common surface collectively formed by the outer faces of the several filler elements.

The pre-assembly stack, illustrated in FIG. 5, is compressed through a distance equal to the total thickness of the twenty five lattice structures, namely, a distance of two inches in the illustrated arrangement where twenty five lattice structures of 0.08 inches each is employed. Rigidity and compressive strength of the lattice structures, which are formed of a steel wire for example, are so much greater than similar properties of the filler material, which are preferably made of an expanded polystyrene, that no compression of the lattice structure occurs during the compression of a pre-assembly stack. All of the stack compression occurs in the several filler elements and this is achieved only via the formation of grooves such as the grooves 88 and 90. The compression is such as to fully and completely embed portions of the several diagonal arms of the sinuous rods in a pair of mating grooves of mutually facing opposed lateral surfaces of adjacent filler elements (except for end lattice structures 78 and 80 which may have outer portions thereof slightly exposed.)

The compression of the subassembly forces the filler elements into a mutually contiguous relation, that is, a relation in which facing surfaces of adjacent filler elements are in close and intimate physical contact with each other substantially throughout the entire area of such facing surfaces, except for the portions at the several grooves, which portions are separated by the interposed sections of the sinuous rod of the lattice structure, as illustrated in FIG. 8. In this final position of filler elements and lattice structures the distance between mutually facing sides of adjacent lattice structures is less than the distance between opposite lateral faces of filler elements interposed therebetween.

With the subassembly stack maintained in its laterally compressed condition (vertically compressed with the stack lying on its side, as viewed in FIGS. 5 and 6), wires to provide a pair of side or cross members, such as wires 100, 102 (FIG. 6), are firmly grasped in clamps 104, 106, being drawn over guides 108, 110 from wire rolls (not shown). The wire rolls are restrained to restrain further unrolling of wire and the clamps 104, 106 are pulled downwardly, as indicated by the arrow in FIG. 6, to thereby tension the wires 100, 102. The tension straightens the wires and positions them closely adjacent and in contact with the side rods of the several lattice structures of the now compressed preassembly stack. Now, while the preassembly stack is maintained in the compressed condition previously described and the cross wires 100, 102 are held in the described position, the latter are spot welded to each of the lattice structure side rods at each point of contact between a cross rod and a side rod. A plurality of such cross wires are employed on each side of the panel, as can be seen in FIGS. 1 and 2. After welding the cross wires are severed at points adjacent the end lattice structures, and the stack is released from the compression of members 84, 86.

The stack of interdigitated filler elements and lattice structures now forms a laterally laminated unitary panel structure rigidly combining a number of filler elements all in close face-to-face contact with one another, a number of rigid reinforcing lattice structures and additional rigid reinforcing cross rods that tie all of the components together in a unitary configuration. All but the end lattice structures are completely embedded in the filler elements. The interaction of the embedded lattice structures and the pressed grooves in contiguous surfaces of the filler elements provide a locking interengagement that helps to rigidify the assembly and to hold the parts together. The lattice structures, in effect, are keys that resist relative sliding of the contiguous filler elements. No bonding agents are needed nor employed, and yet the close and tight contact between adjacent filler elements provides an enhanced barrier to vapor, liquid, heat and sound. The assembly is readily made and the parts are inexpensive. Partly because preformed and pre-cut rigid strips of filler elements are employed, as distinguished from a foamed in place material, a cheaper polystyrene may be employed which is not less expensive than urethanes but has nearly equal characteristics of abrasion resistance, heat and sound insulation and light weight.

When the pre-assembly stack is made, the outer surfaces of the several square cross-section filler elements are readily aligned with one another to form common planar surfaces on each side of the subassembly and moreover are readily and accurately positioned relative to the lattice structures. The latter are also readily aligned and positioned relative to one another so that their outermost portions, namely, the apices of sinuous rods and the side rods thereof, are all positioned in common planes and at precisely controlled and predetermined distances outwardly of the common planar surfaces formed by the outer sides of the filler elements. Repeatability and precision of dimensions and relative positioning of the assembly parts are readily obtained and controlled.

The completed panel may be employed in various types of structures as walls, fences, roofs, and the like, suitably positioning a number of the panels, holding them in a desired configuration by means of temporarily wiring or tying several panels to one another, and thereafter spray coating the panels with a suitable fluid mixture of concrete, gunnite, plaster, or the like. Techniques for employing such panels in various types of structures are known to those skilled in the art and no further details thereof need be disclosed herein. However, it should be noted that the described panel and the method of manufacture thereof facilitates an improved precision construction and coating because of the relatively greater precision of the panel configuration. The described panels have a more precise and more planar surface of filler elements and a more precise and carefully and uniformly positioned (relative to the filler elements) structural framework. There is little or no danger of improper positioning of filler elements which will not protrude outwardly of the outer sides of the lattice structure as is often the case where the panel core is foamed in place. Further, since no bonding agents are employed and the panel core is comprised of a number of separate filter elements merely held against one another but otherwise unconnected, various portions of one or more of the filler elements may be readily severed and removed from the panel if it is necessary to provide holes through the panel.

The completed 4'×8'×2" panel is strong and rigid, but extremely lightweight and may be readily handled by one man, yet it provides the desirable qualities of strength, heat insulation, sound insulation, a vapor barrier, and ready adaptability to coating and securing to other panels and other structures. The panel may readily be made in other dimensions, if desired, or in other than planar configurations.

Figure 10:
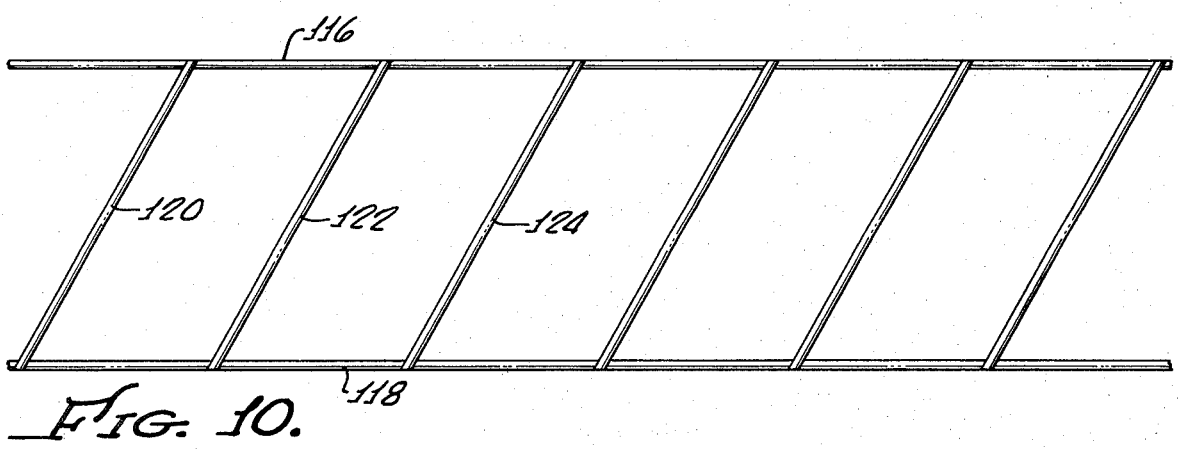
FIGS. 10, 11 and 12 illustrate some typical alternative forms of lattice structures.
Figure 11:
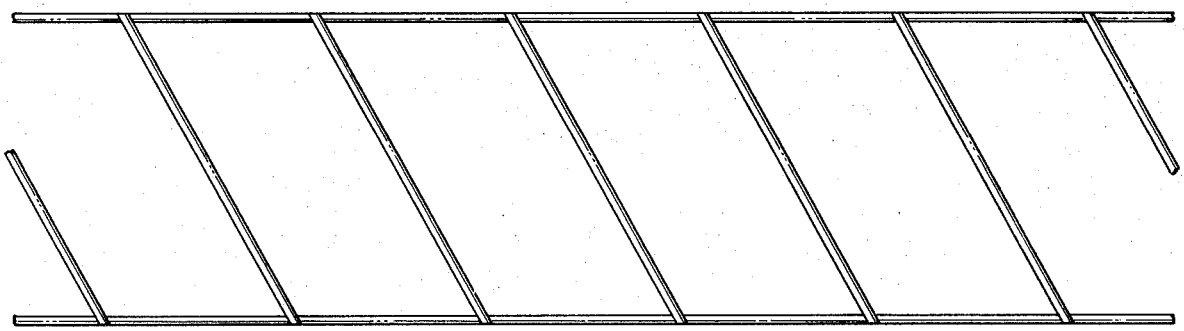

At present an expanded polystyrene cellular material is preferred for manufacture of the filler elements, the latter being cut from blank sheets of polystyrene of approximately 8'×2'×2". Of course, the filler elements may be made from many other materials having suitable properties of the type referred to herein. Thus the filler elements may be formed of any type of material, provided the material is softer than the wire of the lattice structures so that the latter may be partly embedded into the facing surfaces of the filler elements as previously described. Accordingly, wood or composition wood may be also employed for the filler elements, depending upon the particular application for the finished panel. It will be readily understood that the particular configuration of lattice structure illustrated in the drawings is merely exemplary of many different types of substantially planar or nearly two-dimensional structures that may be employed. Thus, instead of a sinuous rod, there may be employed, as illustrated in FIG. 10, a pair of side rods 116, 118 fixed to a plurality of longitudinally spaced substantially parallel cross rods of intermediate rods 120, 122, 124, 35c. which extend at an oblique angle to the side rods. Alternate ones of such lattice structures may be inverted and positioned, as illustrated in FIG. 11, with the inclined or obliquely angled intermediate rods of one lattice structure being inclined oppositely with respect to the inclination of the similar intermediate rods of a next adjacent lattice structure of a given hybrid panel.

Figure 12:
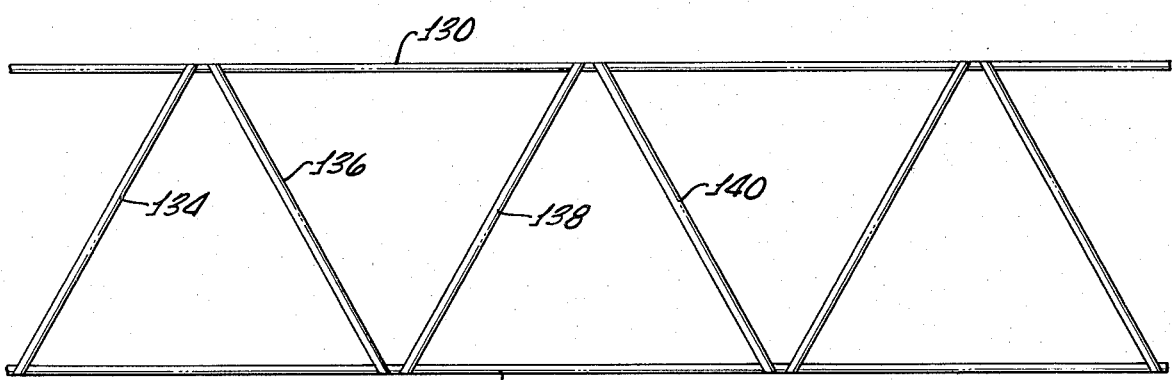

Many other different types of arrangements of lattice structures are available, including an arrangement such as illustrated in FIG. 12, wherein a pair of mutually spaced parallel longitudinally extending side rods 130, 132 are interconnected by pairs of oppositely inclined intermediate rods 134, 136 and 138, 140, to provide a type of truss structure.

Although the illustrated panel configuration is preferred wherein the depth of the lattice structures is greater than the thickness of the filler elements so that the side portions of the lattice structures will extend beyond and are completely free of the filler elements, it will be readily appreciated that principles of the present invention may be employed in a reinforced panel wherein the depth of the lattice structures is equal to or less than the thickness of the filler elements so that the lattice structures are completely embedded in the filler element and only outer surfaces of the filler elements are visible at the common planar surface collectively formed by the several filler elements.

There has been described an improved reinforced panel structure and a method of manufacture which provides a strong, lightweight, economical panel having both the desirable properties of a selected filler and the structural integrity afforded by a rigid framework.

The foregoing detailed description is to be clearly understood as given by way of illustration and example only, the spirit and scope of this invention being limited solely by the appended claims.

What is claimed is:

1. A structural panel comprising:
   a plurality of contiguous elongated filler elements forming a panel core,
   a plurality of lattice structures, each being interposed between a pair of mutually contiguous ones of said elements and each being pressed into mutually opposed surfaces of such contiguous elements whereby mutually adjacent ones of said elements have opposed surfaces in face-to-face contact with each other, and
   a plurality of transverse members extending across said filler elements and across said core, each said transverse member being fixed to at least a group of said lattice structures to thereby hold said lattice structures and filler elements pressed together in a unitary panel configuration,
   said mutually opposed surfaces of said elements having grooves formed therein by pressure of said structures in a pattern corresponding to said lattice structures, portions of said lattice structures being substantially completely embedded in mating grooves of adjacent filler elements whereby said elements provide an enhanced barrier to vapor.

2. The panel of claim 1 wherein said filler elements and lattice structures are substantially free of adhesive bonding.

3. The method of making a reinforced panel comprising the steps of:
  interdigitating a plurality of elongated filler elements and a plurality of substantially flat lattice structures in consecutive alternation,
  laterally compressing said interdigitated lattice structures and filler elements to deform at least some of the filler elements along lines of contact thereof with the lattice structures and to at least partially embed the lattice structures in said filler elements, and
  fixedly securing said lattice structures to one another while said structures and elements are in their compressed condition.

4. The method of claim 3 wherein said step of securing said lattice structures to one another comprises fixedly securing a plurality of elongated cross members to said lattice structures.

5. The method of claim 3 including the step of forming said lattice structures by interconnecting a pair of mutually spaced longitudinally extending side rods to each other by means of a plurality of transverse members extending between said side rods.

6. The method of claim 3 wherein said step of interdigitating comprises positioning at least some of said lattice structures in contact with substantially ungrooved opposing surfaces of adjacent filler elements, and wherein said step of laterally compressing comprises creating grooves in said opposing surfaces by forcing the interposed lattice structures into said opposing surfaces.

7. The method of claim 3 wherein said step of interdigitating is performed before grooves are formed in said filler elements and wherein said step of laterally compressing comprises compressing said interdigitated lattice structures and filler elements to form grooves in said filler elements that receive said lattice structures.

8. A panel made by the method of claim 6.

9. The method of claim 7 wherein said step of securing said lattice structures comprises welding transverse members to said lattice structures while said interdigitated lattice structures and filler elements are maintained in compressed condition.

10. The method of claim 3 wherein said step of interdigitating comprises positioning said lattice structures with portions external to said filler elements, and wherein said step of fixedly securing comprises connecting said external portions of some of said lattice structures to one another.

11. A panel made by the method of claim 3.

12. The panel of claim 1, in which said filler elements are composed of expanded plastic, and said lattice structures and transverse members are formed of wire.

13. The method of making a reinforced panel comprising the steps of:
  interdigitating a plurality of elongated filler elements and a plurality of substantially flat lattice structures in consecutive alternation, laterally pressing said interdigitated lattice structures and filler elements to at least partially embed the lattice structures in said filler elements, fixedly securing said lattice structures to one another in their pressed condition, and
  including the step of forming said lattice structures by sinuously bending a rod and fixedly securing first and second side rods in mutually spaced relation along the length of said sinuous rod.

14. A panel made by the method of claim 13.

15. A reinforced panel made by the steps of:
  interdigitating a plurality of elongated filler elements and a plurality of substantially flat lattice structures in consecutive alternation to form a stack having a width greater than the width of the panel,
  laterally compressing said interdigitated lattice structures and filler elements to deform the latter along lines of contact with the lattice structures so as to at least partially embed the lattice structures in said filler elements and to decrease the width of said stack, and
  fixedly securing said lattice structures to one another in compressed condition.

16. A reinforced panel comprising:
  a plurality of laterally contiguous elongated filler elements each having opposite faces lying in first and second common planes, respectively,
  a plurality of lattice structures respectively interposed between elements of respective adjacent pairs of said filler elements and pressed at least partly into laterally contiguous surfaces of such adjacent elements, thereby to form a laterally laminated panel assembly of alternate laminations of lattice structures and filler elements, said laterally contiguous surfaces including planar portions in face-to-face contact for a major part of the distance between said opposite faces, and a plurality of cross members fixed to at least some of said lattice structures to hold said lattice structures and filler elements in said laterally laminated panel,
  said laterally contiguous surfaces of said filler elements having grooves therein formed by pressures of said structures in patterns that mate with groove patterns in a contiguous filler element surface and with said lattice structures, portions of said lattice structures being substantially completely embedded within said grooves whereby said elements provide an enhanced barrier to vapor.

17. A method of mass-manufacturing a structural building panel, which comprises:
  providing a multiplicity of elongated pre-expanded plastic elements,
  stacking said expanded plastic elements in alternation with structural support elements, in such manner that each structural support element is sandwiched between two expanded plastic elements, and also in such manner that portions of said structural support elements protrude from between said expanded plastic elements, and,
  thereafter making such connection between said protruding portions as to hold said expanded plastic elements and said structural elements in said stacked condition,
  including the step of compressing elements after said stacking to embed said structural support elements in said expanded plastic elements.

18. The method of claim 17, in which said method further comprises spraying an external coating onto said protruding portions, to embed the same therein.

19. The method of making a reinforced panel comprising the steps of:

forming a stack of alternate layers of relatively compressible filler elements and relatively incompressible structural support elements, said filler elements being mutually spaced from one another by interposed structural support elements, comprising said stack to force said structural support elements into said filler elements and to force said filler elements into contact with one another, and connecting at least some of said structural support elements to each other so as to hold said stack in compressed condition.

20. The method of claim 19 wherein said stack is formed with parts of said structural support elements extending outwardly of said filler elements and wherein said step of connecting comprises connecting at least some of said outwardly extending parts to each other.

21. A panel made by the method of claim 19.

* * * * *